(12) United States Patent
Ueda et al.

(10) Patent No.: US 6,886,329 B2
(45) Date of Patent: May 3, 2005

(54) EXHAUST EMISSION CONTROL APPARATUS FOR INTERNAL COMBUSTION ENGINE

(75) Inventors: Katsunori Ueda, Okazaki (JP); Satoshi Nagashima, Okazaki (JP)

(73) Assignee: Mitsubishi Jidosha Kogyo Kabushiki Kaisha (JP)

( * ) Notice: Subject to any disclaimer, the term of this patent is extended or adjusted under 35 U.S.C. 154(b) by 0 days.

(21) Appl. No.: 10/603,590

(22) Filed: Jun. 25, 2003

(65) Prior Publication Data

US 2004/0068982 A1 Apr. 15, 2004

(30) Foreign Application Priority Data

Jun. 26, 2002 (JP) ........................................ 2002-186164

(51) Int. Cl.⁷ ................................................. F01N 3/00
(52) U.S. Cl. ............................ 60/285; 60/274; 60/297; 60/301; 123/443; 123/198 F
(58) Field of Search .......................... 60/274, 285, 286, 60/297, 301; 123/443, 481, 198 F

(56) References Cited

U.S. PATENT DOCUMENTS

| | | | |
|---|---|---|---|
| 5,655,362 A | 8/1997 | Kawajiri et al. ............... 60/276 |
| 6,023,929 A * | 2/2000 | Ma ............................. 60/295 |
| 6,082,100 A | 7/2000 | Boegner et al. ............... 60/278 |
| 6,151,890 A * | 11/2000 | Hoshi ........................... 60/297 |
| 6,164,065 A * | 12/2000 | Denari et al. ................. 60/284 |
| 6,389,806 B1 * | 5/2002 | Glugla et al. ................. 60/284 |
| 6,408,618 B2 * | 6/2002 | Ide ............................... 60/285 |
| 6,516,612 B1 | 2/2003 | Yokoi et al. ................... 60/301 |
| 6,568,177 B1 * | 5/2003 | Surnilla ........................ 60/285 |

FOREIGN PATENT DOCUMENTS

| | | |
|---|---|---|
| DE | 4421 258 A1 | 12/1995 |
| JP | 7-133716 | 5/1995 |

* cited by examiner

Primary Examiner—Binh Q. Tran
(74) Attorney, Agent, or Firm—Rossi, Kimms & McDowell

(57) ABSTRACT

There is provided an exhaust emission control apparatus for an internal combustion engine, which comprises a cylinder suspend operation control section that provides control to suspend combustion of suspended cylinders selected from among a plurality of cylinders according to an operating state of the internal combustion engine, a first exhaust passage connected to the suspended cylinders, a second exhaust passage connected to operating cylinders other than the suspended cylinders, a second exhaust purifying catalyst disposed in the second exhaust passage, and a first exhaust purifying catalyst disposed in the first exhaust passage and having a higher capability to purify exhaust gas than the second exhaust purifying catalyst. It is therefore possible to prevent deterioration of exhaust gas even in the case where cylinders are partially suspended.

7 Claims, 1 Drawing Sheet

EXHAUST EMISSION CONTROL APPARATUS FOR INTERNAL COMBUSTION ENGINE

CROSS REFERENCE TO THE RELATED APPLICATION

This non-provisional application incorporates by reference the subject matter of Application No. 2002-186164 filed in Japan on Jun. 26, 2002, on which a priority claim is based under 35 U.S.C. § 119(a).

BACKGROUND OF THE INVENTION (1) Field of the Invention

The present invention relates to an exhaust emission control apparatus for an internal combustion engine.

(2) Description of the Related Art

As an example of techniques related to exhaust emission control apparatuses, an exhaust emission control apparatus for a variable cylinder engine has been proposed in Japanese Laid-Open Patent Publication (Kokai) No. 7-133716. This exhaust emission control apparatus is applied to a variable cylinder engine that carries out a partial cylinder operation in which a group of cylinders is partially suspended under specific operating conditions. This exhaust emission control apparatus causes exhaust gas emitted from operating cylinders during the partial cylinder operation to pass through a first catalyst, and causes a mixture of exhaust gas having passed through the first catalyst and new air emitted from suspended cylinders to pass through a downstream catalyst. This exhaust emission control apparatus controls the air-fuel ratio of the operating cylinders to a rich air-fuel ratio during the partial cylinder operation, thus causing unburned components having passed through the first catalyst to react with the new air to prevent the temperature of the downstream catalyst from decreasing by heat resulting from the reaction.

However, during the above described partial cylinder operation, a large amount of new air is emitted from the suspended cylinders, and hence the air-fuel ratio of exhaust gas is lean as a whole even if the air-fuel ratio of the operating cylinders has been controlled to be rich. For this reason, this exhaust emission control apparatus has the problem of deteriorating exhaust gas during the partial cylinder operation since the air-fuel ratio of exhaust gas guided finally into the downstream catalyst is lean.

SUMMARY OF THE INVENTION

It is an object of the present invention to provide an exhaust emission control apparatus for an internal combustion engine, which is capable of preventing deterioration of exhaust gas even in the case where cylinders are partially suspended.

To attain the above object, the present invention provides an exhaust emission control apparatus for an internal combustion engine, which comprises a control device that provides control to suspend combustion of at least one of cylinders according to an operating state of the internal combustion engine, a first exhaust passage connected to the suspended cylinders, a second exhaust passage connected to operating cylinders other than the suspended cylinders, a second exhaust purifying catalyst disposed in the second exhaust passage, and a first exhaust purifying catalyst disposed in the first exhaust passage and having a higher capability to purify exhaust gas than the second exhaust purifying catalyst.

Since the first exhaust purifying catalyst on the suspended cylinder side has a higher capability to purify exhaust than the second exhaust purifying catalyst, it is possible to effectively prevent deterioration of exhaust gas even if new air is emitted from the suspended cylinders when the transition is made to the cylinder suspend operation.

BRIEF DESCRIPTION OF THE DRAWINGS

The nature of this invention, as well as other objects and advantages thereof, will be explained in the following with reference to the accompanying drawings, in which like reference character designate the same or similar parts throughout the figures and wherein.

DETAILED DESCRIPTION OF THE PREFERRED EMBODIMENTS

Figure 1:
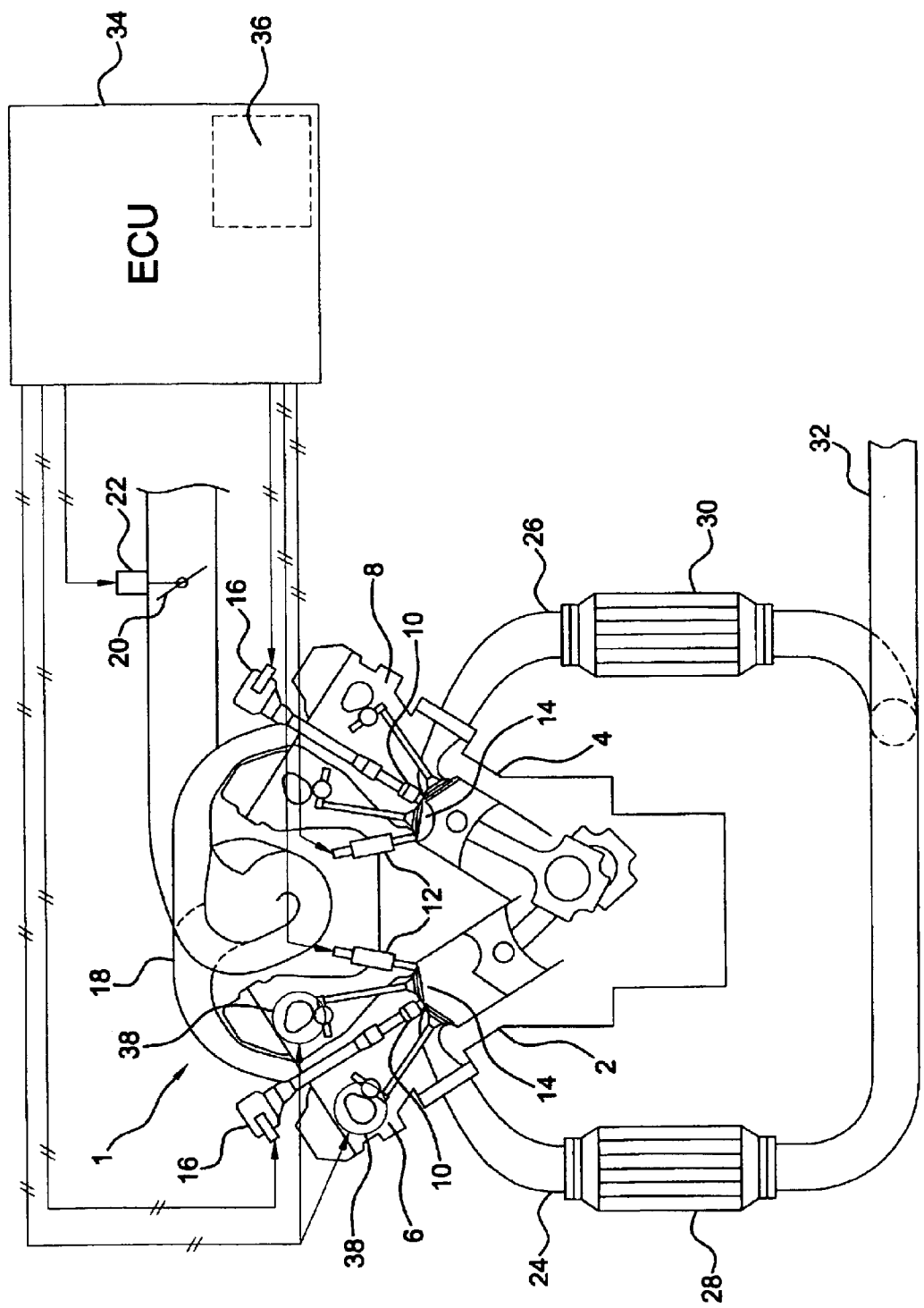
FIG. 1 is a view schematically showing an exhaust emission control apparatus for an internal combustion engine according to an embodiment of the present invention.

The present invention will now be described in detail with reference to the accompanying drawings showing preferred embodiments thereof. It is to be understood, however, that the dimensions, materials, shapes, and arrangements of component parts should not be restricted to the following embodiments, but changes within the purview of the appended claims may be made without departing from the true scope.

FIG. 1 is a view showing an exhaust emission control apparatus for an internal combustion engine provided in a vehicle, for example. The present invention, however, should not necessarily be applied to an internal combustion engine provided in a vehicle, but may be applied for other purposes.

In the present embodiment, an engine 1 as an internal combustion engine has a cylinder layout in which V shape six cylinders are arranged, for example. The engine 1 is a cylinder injection type spark ignition gasoline engine that is capable of performing fuel injection in an intake stroke (intake stroke injection mode) and fuel injection in a compression stroke (compression stroke injection mode) by changing fuel injection modes (operation modes), for example. The engine 1 is capable of easily operating at a stoichiometric air-fuel ratio, operating at a rich-air fuel ratio (rich air-fuel operation), and operating at a lean air-fuel ratio (lean air-fuel ratio operation), and more particularly, the engine 1 is capable of performing combustion at an extremely lean air-fuel ratio in a compression stroke injection mode.

The engine 1 is comprised of a cylinder block which is divided into two banks 2 and 4. A group of cylinders (e.g. three cylinders) is collectively arranged in each of the banks 2 and 4. The engine 1 for a vehicle is constructed such that one bank 2 is located on the front side and the other bank 4 is located on the rear side for the convenience of arrangement in an engine room. For this reason, in the following description, the two banks 2 and 4 will be referred to as "the front bank 2" and "the rear bank 4", respectively for the convenience of explanation.

As shown in FIG. 1, an ignition plug 10 and an electromagnetic fuel injection valve 12 are attached to a cylinder head 6 of each cylinder disposed in the front bank 2 and to a cylinder head 8 of each cylinder disposed in the rear bank 4, so that fuel can be injected directly into each combustion chamber 14. It should be noted that the ignition plug 10 is connected to an associated one of ignition coils 16.

A fuel supply device, not shown, including a fuel tank, not shown, is connected to the fuel injection valve 12. In further detail, the fuel supply device includes a low-pressure fuel pump and a high-pressure fuel pump, from which low-pressure or high-pressure fuel is supplied to the fuel injection valve 12, so that the supplied fuel is injected from the fuel injection valve 12 into the combustion chamber 14.

Each of the cylinder heads 6 and 8 of the respective cylinders is formed with an intake port extending in the direction of its axis. An intake manifold 18 is connected to each intake port such that they are in communication with each other. An electronic throttle valve 20 is provided at an upstream end of the intake manifold 18. The electronic throttle valve 20 is capable of being opened and closed at a desired angle by a motor 22, for example.

Further, the cylinder heads 6 and 8 of the respective cylinders are formed with exhaust ports. The exhaust ports formed in the cylinder heads 6 and 8 are respectively connected to one end of a front exhaust manifold (first exhaust passage) 24 and one end of a rear exhaust manifold (second exhaust passage) 26. A three-way catalyst (first exhaust purifying catalyst) 28 and a three-way catalyst (second exhaust purifying catalyst) 30 are disposed in the front exhaust manifold 24 and the rear exhaust manifold 26, respectively. The front exhaust manifold 24 and the rear exhaust manifold 26 are joined together in one exhaust pipe 32 downstream of the three-way catalysts 28 and 30. It should be noted that a muffler, not shown, is connected to the exhaust pipe 32 via a downstream catalyst, not shown.

Both of the three-way catalysts 28 and 30 are disposed in proximity to the engine 1, and hence they are rapidly activated even immediately after the start of the engine 1 in a cold state. Thus, the three-way catalysts 28 and 30 are capable of starting purifying HC (hydrocarbon) and CO (carbon monoxide) in a satisfactory manner immediately after the cold-start of the engine 1. The three-way catalysts 28 and 30 are also capable of promptly increasing the temperature of the above-mentioned downstream catalyst by reaction heat resulting from catalytic reaction.

A valve operation stop device 38 is provided in an intake and exhaust valve operating mechanism of each cylinder constituting the front bank 2. The valve operation stop device 38 stops the operation of intake and exhaust valves as the need arises, so that, for example, a rocker arm can selectively transmit and shut off its valve opening motion to and from each valve. Note that the valve operation stop device 38 is known, and therefore detailed description thereof is omitted.

An electronic control unit (hereinafter referred to as "the ECU") 34, which controls operations of the engine 1, is connected to the engine 1. The ECU 34 is comprised of an electric input/output device, storage device, central processing unit (CPU), timer counter, and so forth, and controls overall operations of the engine 1. The above-mentioned ignition coils 16, fuel injection valves 12, motor 22, and so forth are connected to the ECU 34, and the ECU 34 outputs control signals to these component parts. For example, the ECU 34 outputs respective optimum values of the fuel injection quantity, the ignition timing, and so forth calculated therein to the ignition coil 16 and the fuel injection valve 12, so that a proper quantity of fuel is injected from the fuel injection valve 12 in proper timing and the ignition plug 10 performs ignition in proper timing. Further, the ECU 34 is comprised of a cylinder suspend operation control section (control device) 36 that controls a cylinder suspend operation, described later. The cylinder suspend operation control section 36 controls the fuel injection valves 12 and the valve operation strop device 38 of the front bank 2 according to the operating state of the engine 1.

As is apparent from the above described construction, while the engine 1 is operating, exhaust gas flowing through the front exhaust manifold 24 and the rear exhaust manifold 26 are guided separately into the two three-way catalysts 28 and 30. Therefore, exhaust gas emitted from the cylinders constituting the front bank 2 passes through the three-way catalyst 28 on the front side, and on the other hand, exhaust gas emitted from the cylinders constituting the rear bank 4 pass through the three-way catalyst 30, so that the exhaust gases can be purified.

In the present embodiment, the three-way catalyst 28 on the front side contains a larger amount of noble metal than the three-way catalyst 30 on the rear side, and hence the three-way catalyst 28 on the front side has a higher capability to purify exhaust than the three-way catalyst 30 on the rear side. As is known, examples of noble metals used for the three-way catalysts 28 and 30 include platinum (Pt), rhodium (Rh), paradigm (Pd), and so forth, and such nobles metals are held on a carrier.

A description will now be given of how the suspend operation control section 36 of the ECU 34 controls the cylinder suspend operation of the engine 1. The cylinder suspend operation control section 36 receives a variety of sensor signals from an accel position sensor, crank angle sensor, throttle sensor, vehicle speed sensor, and so forth, none of which is shown, to detect the operating state of the engine 1. For example, when the vehicle speed lies in a low-speed range, when the engine 1 is operating with a relatively low load being applied thereto, or when the engine 1 is idling with the vehicle being at a standstill, the cylinder suspend operation control section 36 controls the cylinder suspend operation of the engine 1 according to such an operating state.

Specifically, first, the cylinder suspend operation control section 36 stops the operation of the fuel injection valves 12 provided in the front bank 2, and stops the supply of fuel to the cylinders constituting the front bank 2. Next, when the lapse of a predetermined period of time has elapsed after the supply of fuel is stopped, the cylinder suspend operation control section 36 provides control to cause the valve operation stop device 38 to stop the operation of the intake and exhaust valves provided in the front bank 2. As a result, the engine 1 is operated in a state in which the cylinders constituting the front banks 2 are suspended, and only the cylinders constituting the rear bank 4 are operating. During the above described control of the cylinder suspend operation, if combustion performed by the cylinders constituting the front bank 2 is suddenly stopped, a torque shock may occur. To deal with such a shock, the cylinder suspend operation control section 36 operates the intake and exhaust valves even though the supply of fuel is suspended for a predetermined period of time.

In the above-mentioned predetermined period of time, an air cycle (new air is taken in and emitted as it is) in which combustion is not performed by the cylinders constituting the front bank 2 is executed, so that the air-fuel ratio of exhaust gas becomes lean. Consequently, the three-way catalyst 28 on the front side is supplied with excessive oxygen, and oxygen is absorbed into the three-way catalyst 28. Thereafter, when the cylinders constituting the front bank 2 restart combustion, the $NO_X$ reducing and purifying performance is particularly deteriorated due to the absorbed oxygen.

In the present embodiment, however, the three-way catalyst 28 on the front side is adapted to have a higher capability to purify exhaust gas than the three-way catalyst 30 as described above, the purifying performance of exhaust gas can be effectively prevented from being deteriorated temporarily. It should be noted that the three-way catalyst 30 on the rear side has a sufficient capability to purify exhaust gas in a normal operating state, and hence exhaust gas emitted from the cylinders constituting the rear bank 4 is continuously purified by the three-way catalyst 30 even during the control of the cylinder suspend operation. Further, in the present embodiment, the amount of noble metal is increased only for the three-way catalyst 28 on the front side as described above, and hence it is possible to suppress the rise in cost as compared with the case where both of the three-way catalysts 28 and 30 are adapted to have equally high capabilities to purify exhaust gas.

Although in the above described embodiment, the three-way catalysts 28 and 30 are used on the front side and the rear side, but a $NO_X$ occluding catalyst may be used on the front side. The $NO_X$ occluding catalyst is comprised of noble metals such as platinum (Pt) and rhodium (Rh), and is comprised of an occluding material such as an alkali metal or an alkali-earth metal such as barium (Ba). In this case, when the cylinder suspend operation is terminated to start the injection of fuel, the $NO_X$ reducing and purifying performance is temporarily deteriorated, but exhaust gas is never deteriorated since $NO_X$ is occluded by the $NO_X$ occluding catalyst.

Further, in the case where the catalytic capacity of the three-way catalyst 30 on the rear side is set to 0.5 liter, for example, the catalytic capacity of the three-way catalyst 28 on the front side may be se to 1.0 liter, for example, so that the catalytic capacity of the three-way catalyst 28 can be larger than that of the three-way catalyst 30. In this case, the three-way catalyst 28 on the front side is adapted to have a higher capability to purify exhaust gas than the three-way catalyst 30 on the rear side.

As is apparent from the above description, the exhaust emission control apparatus for the internal combustion engine according to the present embodiment can reliably prevent deterioration of exhaust gas and suppress the rise in cost since the respective exhaust purifying catalysts on the suspended cylinder side and the operating cylinder side are configured to have proper capabilities to purify exhaust gas.

It is to be understood that the construction of the internal combustion engine is not limited to the above described embodiment, but for example, the engine 1 may be adapted to have a serial type or opposed type cylinder layout. In this case, exhaust passages are separately provided for suspended cylinders and other cylinders, and two catalysts are provided separately in these exhaust passages to constitute the present invention. Further, an intake pipe injection type engine may be employed as the engine 1.

What is claimed is:

1. An exhaust emission control apparatus for an internal combustion engine, comprising:
    a control device that provides control to suspend combustion of at least one of cylinders according to an operating state of the internal combustion engine;
    a first exhaust passage connected to the at least one suspended cylinder;
    a second exhaust passage connected to operating cylinders other than the at least one suspended cylinder;
    a first exhaust purifying catalyst disposed in said first exhaust passage; and
    a second exhaust purifying catalyst disposed in said second exhaust passage,
    wherein the first exhaust purifying catalyst has a higher capability to purify exhaust gas than said second exhaust purifying catalyst.

2. An exhaust emission control apparatus for an internal combustion engine according to claim 1, wherein said control device is operable when combustion of the at least one suspended cylinder is suspended, for providing control to stop supply of fuel to the at least one suspended cylinder first, and then stop at least one of an intake valve and an exhaust valve of the at least one suspended cylinder when a predetermined period of time has elapsed after the supply of fuel is stopped.

3. An exhaust emission control apparatus for an internal combustion engine according to claim 1, wherein said first exhaust purifying catalyst contains a larger amount of noble metal than said second exhaust purifying catalyst.

4. An exhaust emission control apparatus for an internal combustion engine according to claim 1, wherein said first exhaust purifying catalyst is a NOX occluding catalyst capable of occluding NOX in exhaust gas.

5. An exhaust emission control apparatus for an internal combustion engine according to claim 1, wherein said first exhaust purifying catalyst has a larger catalytic capacity than said second exhaust purifying catalyst.

6. An exhaust emission control apparatus for an internal combustion engine according to claim 1, wherein the internal combustion engine comprises a V shape internal combustion engine.

7. An exhaust emission control apparatus for an internal combustion engine according to claim 6, wherein the at least one suspended cylinder constitutes one bank of the V shape internal combustion engine, and the operating cylinders constitute another bank of the V shaped internal combustion engine.

* * * * *